No. 875,272.　　　　　　　　　　　　　　　　　PATENTED DEC. 31, 1907.
H. O. JACKSON & H. W. PIDGEON.
TIME STAMP.
APPLICATION FILED NOV. 13, 1906.
3 SHEETS—SHEET 1.
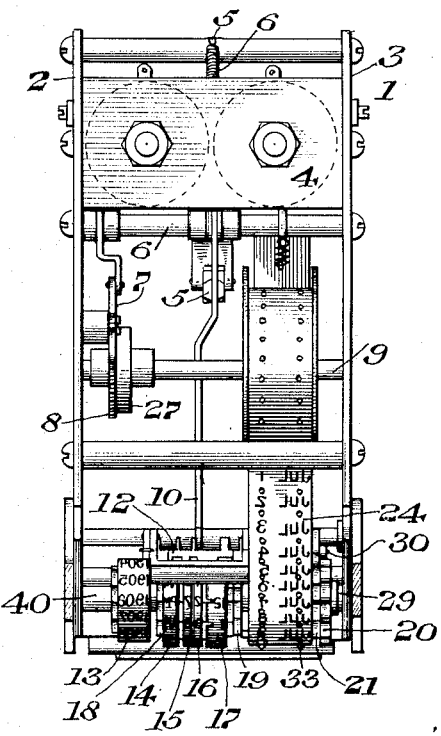
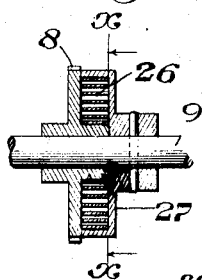
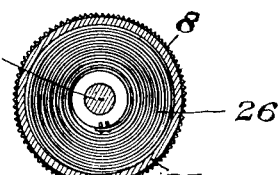
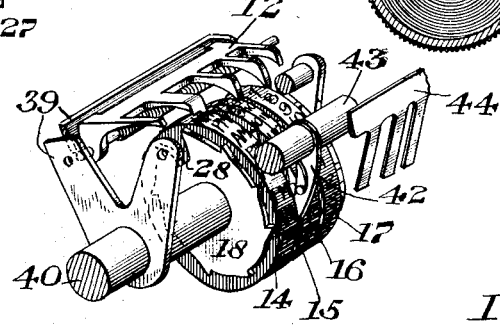
Witnesses:
O. M. Vennich
E. E. Flora
Inventors.
Henry O. Jackson,
Harry W. Pidgeon, by
Fieder Heim Hou Banko
Attorneys.

No. 875,272. PATENTED DEC. 31, 1907.
H. O. JACKSON & H. W. PIDGEON.
TIME STAMP.
APPLICATION FILED NOV. 13, 1906.

3 SHEETS—SHEET 2.

Witnesses:
O. M. Kennick
E. E. Flora

Inventors.
Henry O. Jackson
Hardy W. Pidgeon by
Wiedersheim Fairbanks
Attorneys

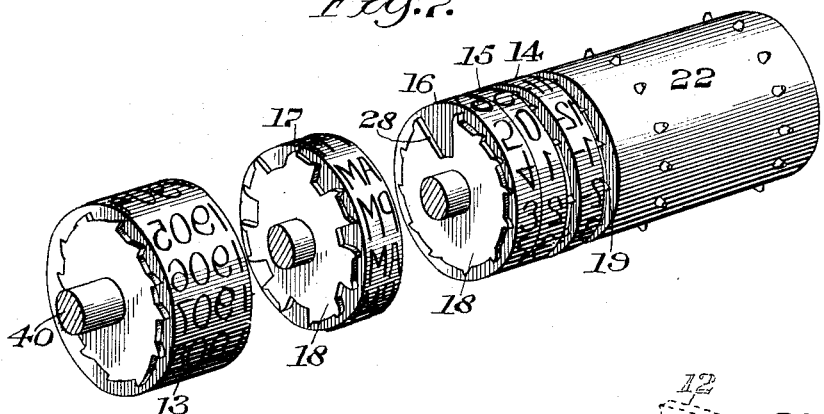
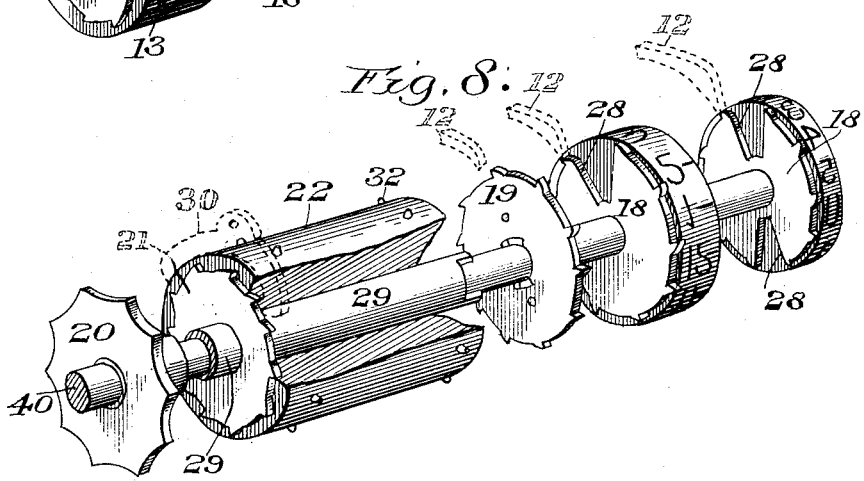
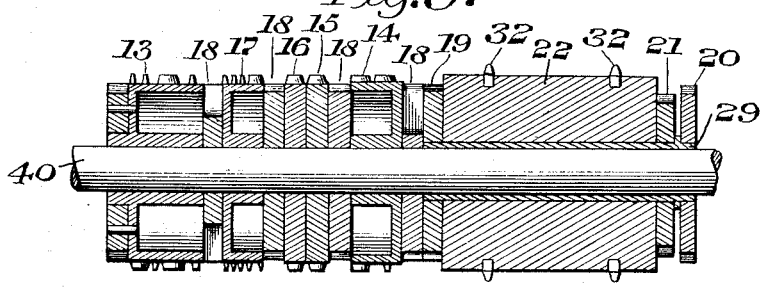

UNITED STATES PATENT OFFICE.

HENRY O. JACKSON, OF NORFOLK, VIRGINIA, AND HARRY W. PIDGEON, OF CHICAGO, ILLINOIS, ASSIGNORS TO AMERICAN CLOCK COMPANY, A CORPORATION OF ILLINOIS.

TIME-STAMP.

No. 875,272.　　　Specification of Letters Patent.　　　Patented Dec. 31, 1907.

Application filed November 13, 1906. Serial No. 343,312.

*To all whom it may concern:*

Be it known that we, HENRY O. JACKSON, of Norfolk, county of Norfolk, State of Virginia, and HARRY W. PIDGEON, of Chicago, county of Cook, State of Illinois, have invented a new and useful Time-Stamp, of which the following is a specification.

Our invention relates to a novel construction of a time stamp which is adapted to be automatically and electrically operated and is capable of registering or recording upon a strip of paper or other suitable material, the exact year, month, day, hour and minute when an impression takes place, provision being made whereby the apparatus requires attention but once in a year, and means being provided to simplify the structure and arrangement of the printing and indicating devices and the mechanism for bringing the matter to be printed into coaction with the other devices so as to render the structure stable and not likely to get out of order, whereby there will be clearly indicated and exposed to view in proper order and in the same right line the year, the month, the day of the month and the time of the day according to requirements.

To the above ends our invention consists broadly, in the novel combination and arrangement of devices, as hereinafter described and claimed, for actuating a series of dating and time indicating means, all mounted to revolve independently and in proper order, preferably upon the same horizontal axis.

For the purpose of illustrating our invention, we shall show one form of mechanism, as this embodiment best illustrates the principle of our invention and has been found in practice to give very satisfactory results, although it is obvious that the principal instrumentalities of which our invention consists can be variously arranged and organized and in the accompanying drawings we have shown one embodiment thereof, which has been found to be practicable and efficient, although it is to be understood that our invention is not limited to this specific arrangement and organization of these instrumentalities.

Figure 2:
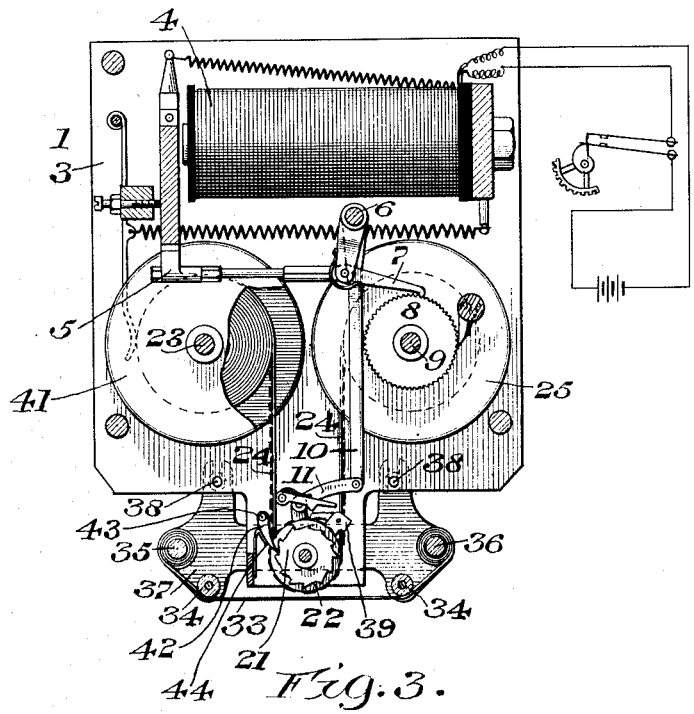
Figure 3:
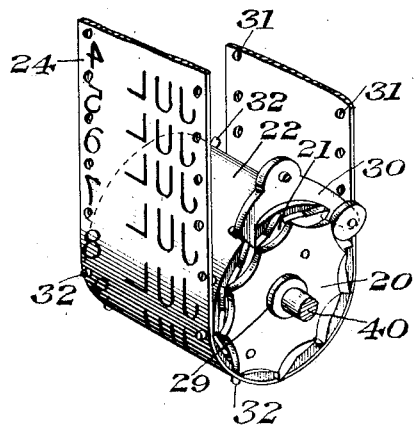

Figure 1 represents a side elevation of a time stamp embodying our invention. Fig. 2 represents a front elevation, partly in section, having the front plate removed, showing the spring barrel and dating ribbon. Fig. 3 represents a perspective view in detached position, of the dating ribbon and escape wheel pallet and cam release mechanism. Fig. 4 represents a perspective view of the type wheels and live pawl employed. Fig. 5 represents a sectional view of the spring barrel and ratchet wheel, the section being taken on line $x$—$x$, Fig. 6. Fig. 6 represents a sectional view of the spring barrel showing the internal construction of the same. Fig. 7 represents a perspective view of the type wheels separated to show ratchet wheels mounted on their respective type wheels. Fig. 8 represents a reverse perspective view of the type wheels and drum showing ratchet wheels cam and sleeve of drum, section of drum being cut out to show the sleeve. Fig. 9 represents a sectional view of type wheels and drum mounted on the shaft.

Similar numerals of reference indicate corresponding parts in the figures.

Referring to the drawings:—In the detailed description of our invention we shall refer particularly to the novel elements to which our invention relates, describing only in a general way the other or old mechanical features which are familiar to those skilled in the art.

1 designates our novel construction of time stamp, the same consisting of the outer plates 2 and 3, within and by which the principal parts of our novel device are contained and supported.

4 designates the electro magnet provided with an armature having a spring of the usual construction, whereby the armature is actuated in opposition to its actuation by the magnet, as will be understood by those skilled in the art.

5 designates an extension of the armature which is connected to a rock shaft 6 by suitable intermediate mechanism, said rock shaft having a spring actuated pawl 7 connected thereto, said pawl engaging with a ratchet wheel 8 mounted on the shaft 9, which is supported in suitable bearings in the plates 2 and 3, as will be understood from Figs. 1 and 2.

10 designates a lever which is attached to the rock shaft 6, the lower extremity of said lever having pivotally connected thereto the link 11, which is connected with a carriage 39, said carriage having pivoted within it, the live pawl 12, the construction of which latter will be apparent from Fig. 4, said live pawl being adapted to actuate the type wheels 14, 15, 16 and 17 by means of the ratchets 18 connected to each type wheel, as will be understood from Fig. 9, said ratchets and type wheels being loose on the shaft 40. In addition to the ratchets 18 connected to the type wheels 14, 15, 16 and 17 said live pawl 12 is also adapted to actuate a ratchet 19 connected to a cam wheel 20, which is fastened to the sleeve 29 supported by the shaft 40, mounted in suitable bearings, on which sleeve is mounted a drum 22 having fastened to one end thereof an escapement wheel 21.

24 designates the type ribbon which is mounted on a reel 41 mounted on the shaft 23, as will be understood from Fig. 2, one end of said ribbon 24 being fastened to a reel 25 mounted on the shaft 9, said ribbon traveling over the drum 22, as will be understood from Figs. 2 and 3.

26 is a ribbon-tension spring within the barrel 27, as seen in Figs. 5 and 6.

It will be seen that in the preferred embodiment of our invention, the ribbon 24 carries upon it characters indicative of the months and the days of the month, while the wheels 17, 16, and 15 carry upon them characters indicative of the hours and minutes of the day, while the wheel 14 has thereon characters indicative of A. M. or P. M., while the wheel 13 has upon it characters indicative of the years, as 1906, 1907, 1908, etc.

In order to retain the ratchets 18 in their proper respective positions, we employ the pawls 42 mounted on the shaft 43, seen in Figs. 2 and 4, one pawl for each ratchet, and we also employ the comb spring 44 bearing on each pawl to retain the same in position.

The operation will be apparent to those skilled in the art, since it will be apparent that when the magnet 4 is energized by reason of suitable electrically operated clock mechanism, which we have shown diagrammatically at the right of Fig. 2, the armature will move the lever 5 forwardly or to the right of the position seen in Fig. 2, thereby causing the pawl 7 to engage with the ratchet teeth 8, thereby moving said ratchet wheel 8 one notch to the right and winding the spring 26, as seen in Figs. 5 and 6, thereby placing a tension on the ribbon 24, as will be evident. It will, consequently, be apparent that every motion or actuation of the armature will increase the tension on the spring 26 until such time as it will slip in the barrel 27, and that, therefore, any further motion or actuation of said armature will simply tend to keep the spring at a desired tension. The type wheels are provided with notches and pawls to produce proper rotation at the proper time, as is common to all devices of this character, as will be apparent to those skilled in the art, and it will be seen that after the type wheels have moved through a period of twenty four hours less one minute, then said live pawl 12 will drop into a notch on each type wheel, as indicated at 28, Figs. 4, 7 and 8 and engage in the ratchet 19, which moves the cam 20, thereby releasing the escape wheel 21 and allowing a movement to the ribbon 24, which has to jump forward one notch, thereby changing the date. At the beginning of the movement of the ratchet 19, which is connected to the cam 20 by means of a sleeve 29, said cam being fast on said sleeve, the pallet 30 is disengaged from the escape wheel 21, thereby allowing the type ribbon 24 to advance to another date, which action will occur at twelve o'clock, at which instant all the type wheels 14, 15, 16 and 17 and the drum 22 advance one notch. It will thus be seen that this operation is repeated once every twenty four hours, as the various dating wheels are operated according to the minutes and hours in each day, the wheel 13, indicating the year being operated by hand at the close of each year and at the same time the type ribbon 24 is re-wound on the wheel 41. In rewinding the ribbon 24 the spring 26 slips in the barrel 27 to the desired extent, as will be understood to those skilled in the art. The device is then ready for action for a period of another year. It will be understood that in order that the ribbon 24 may be moved in unison with the drum 22 at all times, we provide said ribbon 24 with holes 31 which are adapted to engage pins 32 carried by said drum so that there is no liability of the ribbon and drum moving independently or irregularly with respect to each other.

It will be understood that our invention is in practice used in connection with a suitable ink ribbon which we have indicated at 33, said ink ribbon being adapted to pass over rollers 34 and to be wound automatically or by hand upon the rollers 35 and 36. In practice we employ, in conjunction with the ink ribbon, suitable mechanism for enabling said ribbon to be actuated automatically, but in the present instance we have shown the same conventionally as being mounted on suitable spools or rollers, as 35 and 36, carried in the frame or side pieces 37, which are secured in position by fastening devices 38, whereby the ink ribbon and its adjuncts can be readily removed according to requirements, for the purposes of inspection and repairs.

The automatic change of the time in the stamp is effected by electricity, the electric current by which the changes are effected being received from a clock or regulating mechanism of well known construction and with which the device may be in circuit, said regulator being ordinarily capable of closing the circuit and thus giving an impulse to the indicator mechanism of the stamp once every minute, as is apparent to those skilled in the art, although it will be evident that we do not desire to be limited to any particular type of electric clock or regulating mechanism for carrying out the broad principles of our invention.

It will be understood by those skilled in the art that our novel device is particularly adapted to be used in conjunction with suitable impression mechanism located below the ink ribbon 33 whereby at the proper intervals when it is desired to indicate the exact period when a transaction has taken place, a suitable platen or impression device, not shown, will be caused to operate in an upward direction so as to impress upon the sheet of paper, ticket or other material interposed between the type wheels and the ribbon 33, the year, month, day, hour and minute when the transaction occurred or when said impression took place. In one application of our invention we have employed the same to great advantage in the stamping of accident insurance tickets in a coin controlled apparatus, but in its broad aspects it will, of course, be understood that our invention is capable of general application and is not to be limited or restricted in its use to any particular type of actuating impression or other mechanism.

Having thus described my invention, what I claim as new and desire to secure by Letters Patent, is:—

1. In a time stamp, a type ribbon having thereon characters indicative of the months and the days of the month, a series of reels over which said ribbon passes and upon which it is alternately wound and unwound from one to the other, a tension device for said ribbon, a drum over which the ribbon passes, a shaft supporting said drum, wheels on said shaft, date and time indicating devices on said wheels, and electric time controlled means for actuating said ribbons and wheels.

2. In a time stamp, a type ribbon having thereon characters indicative of the months and the days of the month, a series of reels over which said ribbon passes and upon which it is alternately wound and unwound from one to the other, a tension device for said ribbon, a drum over which the ribbon passes, a shaft supporting said drum, wheels on said shaft, date and time indicating devices on said wheels, electric time controlled means for actuating said ribbons and wheels, and an ink ribbon located below said wheels.

3. In a time stamp, a type ribbon having thereon characters indicative of the months and the days of the month, a series of reels over which said ribbon passes and upon which it is alternately wound and unwound from one to the other, a tension device for said ribbon, a drum over which the ribbon passes, a shaft supporting said drum, wheels on said shaft, date and time indicating devices on said wheels, and electric time controlled means for intermittently actuating said ribbons and wheels.

4. In a time stamp, a type ribbon having thereon characters indicative of the months and the days of the month, a series of reels over which said ribbon passes and upon which it is alternately wound and unwound from one to the other, a tension device for said ribbon, a drum over which the ribbon passes, a shaft supporting said drum, wheels on said shaft, date and time indicating devices on said wheels, electric time controlled means for actuating said ribbons and wheels, an ink ribbon located below said wheels, and means for locking said type ribbon and wheels.

5. In a time stamp, a shaft having a drum thereon, a plurality of reels above said shaft, a type ribbon passing around said drum and adapted to be wound or unwound with respect to each of said reels, said type ribbon having thereon characters indicative of the months and days of the months, devices in alinement with said drum having thereon characters indicative of the hours and time of day and the year, and an electrically operated device for effecting the actuation of said type ribbon and its adjuncts.

6. In a time stamp, a shaft having a drum thereon, wheels mounted on said shaft, and having thereon characters indicative of the hours and time of day, a wheel mounted on said shaft having thereon characters indicative of years, a plurality of reels located above said drum, a type ribbon passing around said drum and having its ends secured to said reels, said type ribbon having thereon characters indicative of the months and days of the months, and electrically operated devices for effecting the actuation of said wheels and ribbon.

7. In a time stamp, a shaft having a drum thereon, wheels mounted on said shaft, and having thereon characters indicative of the hours and time of day, a wheel mounted on said shaft having thereon characters indicative of years, a plurality of reels located above said drum, a type ribbon passing around said drum and having its ends secured to said reels, said type ribbon having thereon characters indicative of the months and days of the months, and electrically operated devices for effecting the actuation of said wheels and type ribbon, in combination with an ink ribbon located below said wheels.

8. In a time stamp, an electro magnet, an armature actuated thereby, a plurality of reels having mounted thereon a type ribbon carrying characters indicative of months and days of the months, a drum over which said type ribbon passes, a shaft on which said drum is mounted, type wheels carried on said shaft and bearing characters indicative of the hours, months and periods of the day, a type wheel having thereon characters indicative of years, a live pawl for operating said type wheels, and connections from said pawl to said armature.

9. In a time stamp, a shaft having a drum thereon, type wheels mounted on said shaft and having characters indicative of the hours and time of the day, a wheel mounted on said shaft having thereon characters indicative of years, a plurality of reels located above said drum, a tension device for one of said reels, a type ribbon passing around said reels said type ribbon having thereon characters indicative of the months and days of the month, and electrically operated devices for effecting the actuation of said wheels and type ribbon.

10. In a time stamp, a magnet, an armature actuated thereby, a shaft having a ratchet wheel thereon, a rock shaft, connections from said armature to said rock shaft, a pawl supported from said rock shaft for actuating said ratchet wheel, a reel on said shaft carrying a type ribbon having thereon characters indicative of months and days of the month, a drum around which said type ribbon passes, a second reel upon which the other end of said type ribbon is mounted, a series of wheels having thereon characters indicative of the hours and time of the day, a wheel indicative of the years, a live pawl for actuating said wheels, and connections from said rock shaft to said live pawl for actuating the latter.

11. In a time stamp, an electro magnet 4, an armature actuated thereby, a rock shaft suitably supported, an extension from said armature leading to said rock shaft, a pawl connected to said rock shaft, a shaft 9 having suitable bearings, a tension device, a ratchet wheel 8 mounted on said shaft, said pawl engaging with said ratchet wheel, a lever 10, connected to said rock shaft and movable in unison therewith, a link 11 attached to the lower extremity of said lever, a carriage connected to said link, a live pawl 12 secured to said carriage, a series of type wheels 14, 15, 16 and 17 having thereon characters indicative of periods of the day, ratchets on said type wheels adapted to be operated by said live pawl, a type wheel 13 having thereon characters indicative of years, a cam wheel operated by said live pawl, a shaft on which said cam wheel is mounted, a drum 22 on said shaft, an escape wheel 21 on said drum, a shaft 23 having secured thereto a reel, a type ribbon having one end secured to said reel, a reel 25 having the other end of said type ribbon secured thereto, a drum 22 around which said type ribbon passes, and means for actuating and locking said drum and type wheels at the desired intervals.

HENRY O. JACKSON,
HARRY W. PIDGEON.

Witnesses:
E. HAYWARD FAIRBANKS,
C. D. McVAY.